United States Patent
Barnes

(10) Patent No.: US 9,462,238 B1
(45) Date of Patent: Oct. 4, 2016

(54) REMOTE AGENT CAPTURE AND MONITORING

(75) Inventor: Robert John Barnes, Watford Herts (GB)

(73) Assignee: Verint Americas Inc., Alpharetta, GA (US)

( * ) Notice: Subject to any disclaimer, the term of this patent is extended or adjusted under 35 U.S.C. 154(b) by 504 days.

(21) Appl. No.: 12/914,991

(22) Filed: Oct. 28, 2010

Related U.S. Application Data

(60) Provisional application No. 61/256,595, filed on Oct. 30, 2009.

(51) Int. Cl.
- *H04N 5/77* (2006.01)
- *H04N 9/80* (2006.01)
- *H04N 9/29* (2006.01)
- *G11B 27/10* (2006.01)

(52) U.S. Cl.
CPC ............... *H04N 9/29* (2013.01); *G11B 27/10* (2013.01)

(58) Field of Classification Search
CPC ..... H04L 63/08; H04H 60/33; H04H 60/331
USPC .................................. 386/223–224, 239–248
See application file for complete search history.

(56) References Cited

U.S. PATENT DOCUMENTS

| | | | |
|---|---|---|---|
| 2004/0010720 A1* | 1/2004 | Singh et al. ................... | 713/201 |
| 2004/0103409 A1* | 5/2004 | Hayner ............... | G06F 11/3409 717/143 |
| 2005/0030374 A1* | 2/2005 | Goldenberg ...... | H04M 3/42221 348/143 |
| 2005/0114379 A1* | 5/2005 | Lee ............................... | 707/102 |
| 2005/0271352 A1* | 12/2005 | Yokouchi ........................ | 386/4 |
| 2005/0272410 A1* | 12/2005 | Chen .......................... | 455/414.1 |
| 2006/0126817 A1* | 6/2006 | Beckett et al. ........... | 379/265.06 |
| 2007/0098145 A1* | 5/2007 | Kirkland et al. ........ | 379/201.01 |
| 2009/0016522 A1* | 1/2009 | Torres et al. ............ | 379/265.06 |

* cited by examiner

*Primary Examiner* — Hung Dang
(74) *Attorney, Agent, or Firm* — Meunier Carlin & Curfman

(57) ABSTRACT

Methods and systems for monitoring a remote agent. An agent's workstation may be provided with an application that receives a trigger condition at an agent workstation during a communication between the remote agent and a caller. During the communication, it may be determined if video imagery of the remote agent is required. If so, video imagery capture may be triggered. The video imagery may be associated with activities of the remote agent during the capture, and the video imagery stored at a recorder for later playback.

21 Claims, 6 Drawing Sheets

REMOTE AGENT CAPTURE AND MONITORING

CROSS-REFERENCE TO RELATED APPLICATION

This application claims priority to U.S. Patent Application No. 61/256,595, filed on Oct. 30, 2009, and entitled "Remote Agent Capture," which is incorporated by reference herein in its entirety.

BACKGROUND

This disclosure relates to computer-telephony integration systems and methods, and more particularly to systems and methods for voice and data recording and monitoring of a remote agent at a computer workstation.

In some business environments, computers are used in conjunction with telephones in order to provide services. For example, in providing credit card-related services, it is known to provide customer service representatives (hereinafter referred to as "agents" or "employees"), with access to a computer workstation as well as a telephone. Some of the agents may work remotely in locations away from a, e.g., contact center. In the process of providing telephonic service from the agent to the customer, a customer can contact the agent (or vice versa) through a telephone connection, and the customer and the agent will discuss matters relating to the customer's account over the telephone.

SUMMARY

In order to provide supervision of such agents, it is often desired to allow an agent's supervisor (hereinafter "supervisor"), with a way to monitor the activities of such agents during their telephone conversations together with video or still imagery of the agents themselves. Such monitoring of a "monitored workstation" may be considered quality control of the agent's services. For example, it is worthwhile for a supervisor to know if an agent is using his/her computer time efficiently (not moving back and forth from various screens or applications unnecessarily), or is rude or discourteous while on the telephone, or is in-fact the agent. Such information can be determined by having a supervisor "look over the shoulder" of an agent, viewing him/her, his/her computer activities, as well as viewing and listening to the telephone conversation.

Monitoring systems are disclosed herein that transparently monitor the agent(s) and send video imagery to a monitor server and/or a record for analysis and storage. These monitoring systems record the activities of the agent(s), making the records available for supervisor review, training, and provide an audit trail for transactions entered by the agent(s). Other features and advantages of the present disclosure will become apparent upon reading the following detailed description of the disclosure when taken in conjunction with the drawings and claims.

DETAILED DESCRIPTION

Figure 1:
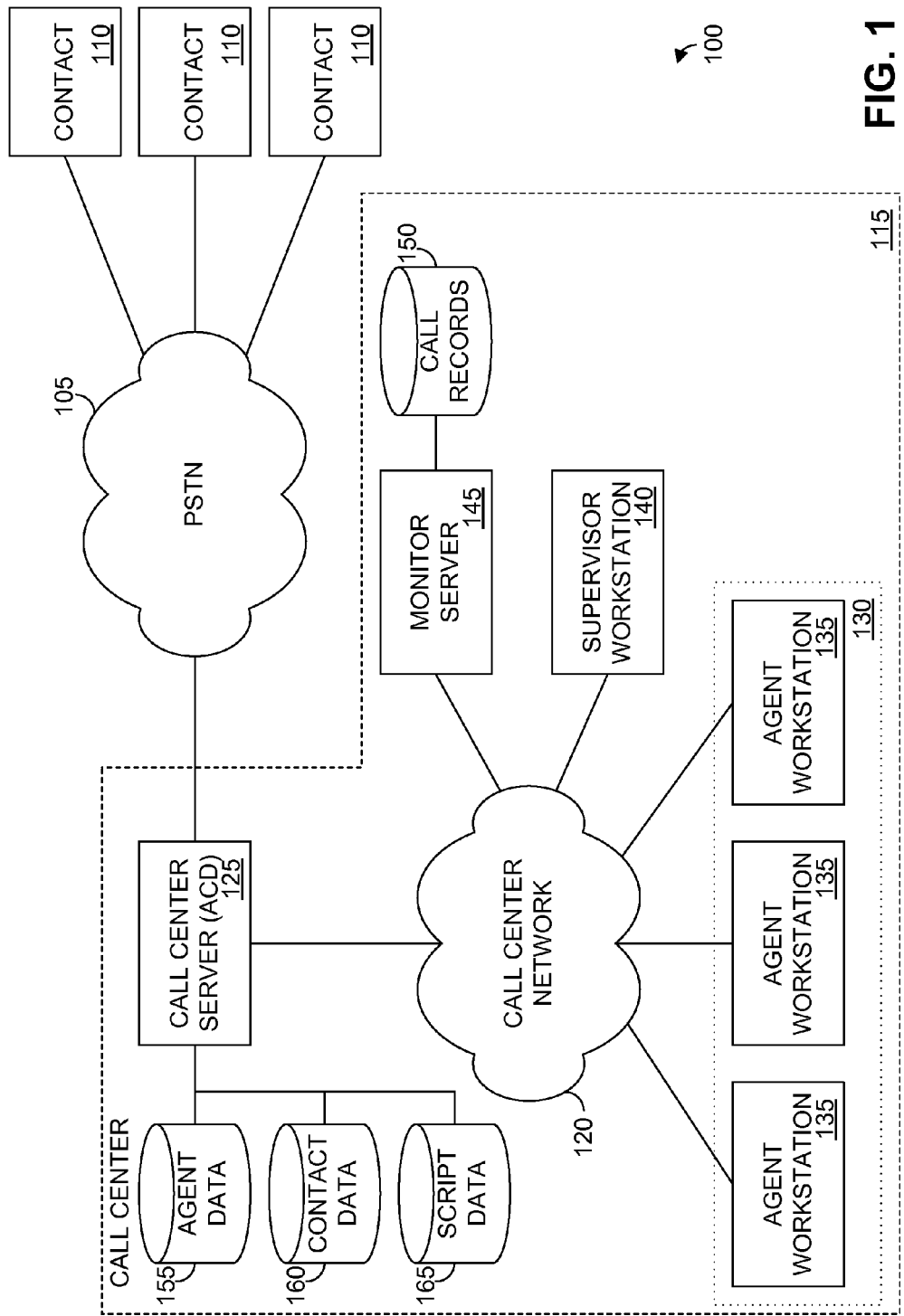
FIG. 1 is a block diagram illustrating an example environment where a complex recording trigger may be used.

Reference is now made to FIG. 1, which illustrates a configuration 100 according to the present disclosure. As shown, the configuration 100 includes a public switched telephone network (PSTN) 105, connecting a plurality of contacts 110 to an interaction center 115 (e.g., a call center). The call center 115 can include an internal voice/data network 120, to which is attached a server 125, a group 130 of monitored workstations 135 (e.g., agent workstations), a monitoring workstation 140 (e.g., supervisor workstation), and a monitor server 145. Networking between these elements may be done through TCP/IP protocols, although other network protocols may be used without departing from the scope of the present disclosure.

On-screen activities conducted at the monitored workstation 135 can be viewed (or "monitored") by the supervisor on the screen of the monitoring workstation 140 either in real time (i.e., as the activities are actually occurring), and/or the on-screen activities conducted at the monitored workstation 135 can be recorded by the monitor server 145 to a call records database 150 and "played back" at the monitoring workstation 140 at a later time. These activities may be played back much as one would play back the video tape of a television program, that is the on-screen and synchronized voice activities that occurred at the monitored workstation 135 may allowed to "play" at the monitoring workstation 140 substantially as they previously actually happened, portions may be replayed, the activities may be stopped or "paused" for particular review, and certain portions may be skipped if so desired.

It should be understood that the call center server 125 is configured to receive and route telephone calls received via the public switched telephone network 105 from contacts 110 to any of a number of agent workstations 135 via the internal call center network 120. The call center server 125 can perform the functions of an automatic call distribution system; for example, by retrieving contact data from the contact database 155 and analyzing agent data from an agent data database 160 to determine which of the agents working at the agent workstations 135 should receive an incoming call from a contact 110. Moreover, the call center server 125 can provide script data stored in a script data database 165 to the agent workstation to assist the agent in communicating with the contact. Where the call center is a technical assistance center for a product, the script could be a troubleshooting manual that gives the agent several possible problems and solutions for the symptoms specified by the contact. It should be noted, however, that the script could be implemented in many different ways, such as, for example, a web page. Moreover, the script could be stored on the agent workstation rather than the call center server.

The software on the monitor server 145 can be configured to send data polls to software installed and running on the agent workstation 135. It should be understood, however, that the agent workstation 135 can be configured to provide the updates to the monitor without prompting from the monitor server 145. The software on the agent workstation 135 can intercept workstation data, by "hooking" or "scraping." Hooking operates by capturing operating system graphics primitives relevant to actual screen display, and either returns selected screen portions (referred to as "changed regions") which have changed since the last data poll. The changed regions are displayable at a remote location in real time or can be recorded for display at a remote location at a later time. The technique is substantially "passive" in that it preferably does not perceptibly interfere with the operation of the agent's workstation, which would be a signal to the agent that he or she is being monitored.

As mentioned above, the monitor could also use a "scraping" technique. The "scraping" can occur in response to a poll. When the poll is received, the full screen is grabbed and compared (such as by an XOR operation) to a previously grabbed screen, and changed regions including the screen differences are sent over the network to the server. In one implementation, the first and last "differences" in the XOR comparison are determined, and all data therebetween is considered within the changed region, which is not necessarily rectangular. However, it should be recognized that the entire screen or portions of the screen could be sent over the network using either the "hooking" or "scraping" techniques, or the primitive graphics commands themselves, or any other technique operable communicate the agent's activities for recording may be sent in accordance with the present disclosure.

In order to provide consistent and acceptable service to contacts, systems can monitor both the "desktop" screen display and the telephonic habits of the agents, in order to properly train agents and to provide quality control of the agent's services. Moreover, the computer activities of the agent are synchronized with the telephone communication of the agent. Thus, a later viewer (e.g., the supervisor) could view the agent's activities and listen to the conversation substantially as it occurred in real time.

Figure 2:
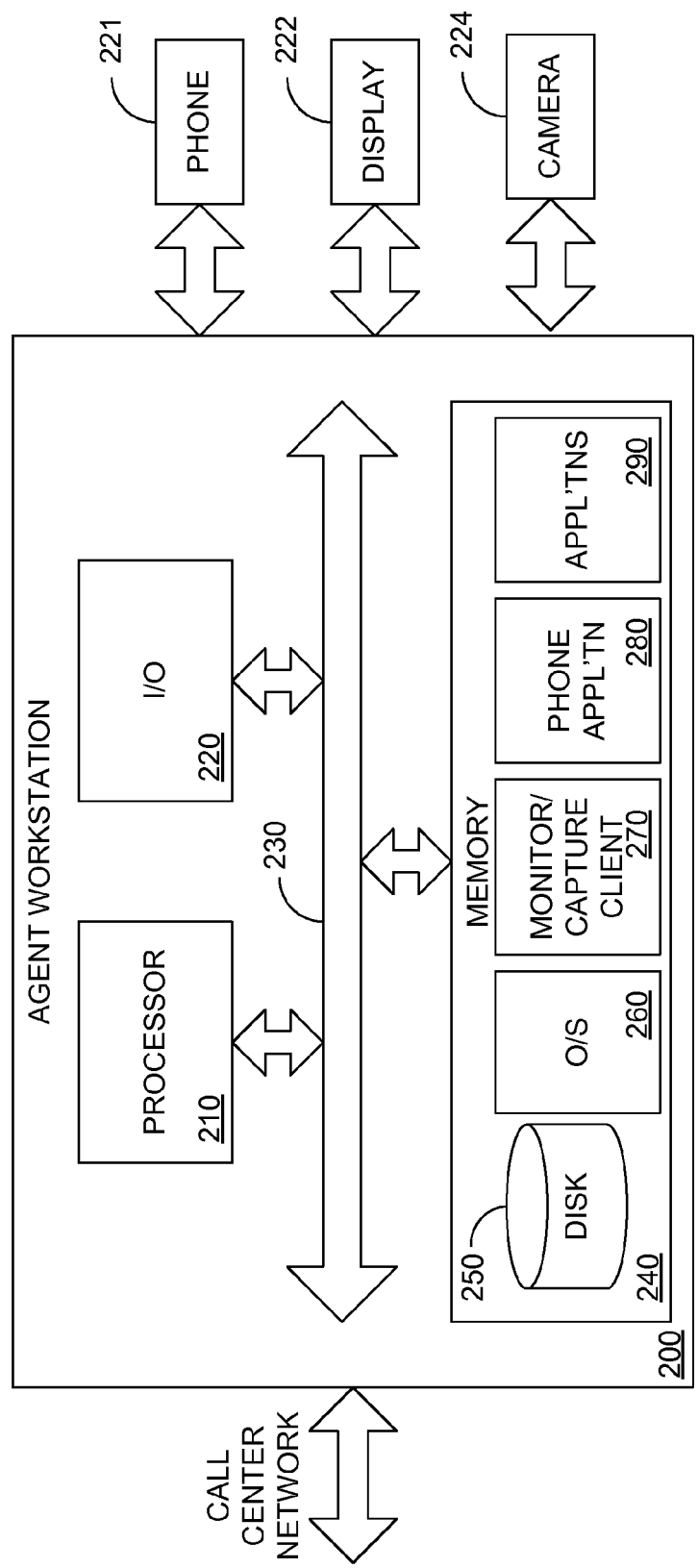
FIG. 2 is a block diagram illustrating an agent workstation including monitor and capture clients used to monitor and/or record activity occurring on the agent workstation.

FIG. 2 is a block diagram of a monitored workstation 200 and includes hardware (processor 210, I/O 220, bus 230, memory 240, disk 250, etc.) and software (operating system (O/S) 260, monitor/capture client 270, phone application 280, and other applications 290) mounted thereon. A telephone signal 221 may be routed through the workstation 200, as shown. Such a configuration could help to facilitate the capture and synchronization of the display data 222 and the voice data 221. However, it should be noted that a telephone signal could be provided independently from the agent's computer through the use of an independent telephone extension.

The hardware used can be personal computer (PC) hardware such as that used to operate OS/2 available from IBM Corporation of White Plains, N.Y., or Windows available from Microsoft Corporation of Redmond, Wash. However, it should be understood that different hardware configurations may be used without departing from the spirit and scope of the present disclosure.

The workstation 200 is loaded with and runs a graphics user interface such as, for example, OS/2 (indicated generally as 260 and defined by the dotted line). However, it should be noted that the scope of this disclosure is not limited to a particular operating system. For example, the teachings of the present disclosure can be applied to any number of operating systems, including, but not limited to, OS/2, Windows, Unix-type operating systems such as available from Sun Microsystems of Santa Clara, Calif., Linux available from RedHat Corporation of Raleigh, N.C., Mac OS X available from Apple Computer, Inc. of Cupertino, Calif., among many others. As is known in the art, the OS/2 operating system 260 incorporates the use of a graphics engine (known as OS2GRE in OS/2 and GDI in Windows).

Upon receiving an instruction from, for example, one of applications 290, (example: "draw a window") the operating system will utilize its graphics engine to send a combination of typically smaller, more specific (i.e., low level) instructions by means of graphics primitives (e.g. "draw line", "bitblt" "draw wide border", "draw text", etc.,) to a display driver associated with the particular video display hardware (e.g., I/O 220) is being used within the monitored workstation.

As noted in more detail below, it is these graphics primitives that are interpreted under the present disclosure in order to define localized screen changes. Such screen changes can be due to "on screen typing" (as described in detail below), can be pursuant to manual or automatic user commands (open/close window), or can be other automatic screen changes, such as caused by a blinking cursor or an on-screen clock.

As may be understood, multiple applications 280, 290 may be used by the agent on the workstation 200 to provide service to the customers. These applications can include myriad programs, such as, for example, a web browser, an online help manual, training programs, and scheduling programs, among many others. Because every application is drawing to its own virtual desktop, and is not aware of what the other applications are doing, the graphics engine responds to different requests from the applications, determining what requests should be visible to the end user, and sends those requests as a list of primitives to the video driver.

The general configuration and operation of the operating system 260 such as OS/2 is assumed to be known to one skilled in the art; however, the reference manual "OS/2 2.0 Technical Library—Presentation Driver Reference, Version 2.00", Published by IBM, First Edition, copyright 1992, and subsequent versions thereof, are incorporated herein by reference, including but not limited to the general operation of the OS/2 operating system, the function and operation of graphics primitives generally and individually, and dynamic link library functions (DLLs).

The capturing software generally consists of a capture module and a monitor module (e.g., monitor/capture client 270). The operation of the monitor/capture modules is described in detail in U.S. patent application Ser. No. 10/118,848, entitled "Improved Method and Apparatus for Simultaneously Monitoring Computer User Screen and Telephone Activity from a Remote Location," which is hereby incorporated by reference in its entirety.

In addition, the agent workstation 135 may include a camera 224. The camera 224 may provide a video/still image solution that may stream continuous video/pictures or be under control of another system within the monitor server 145. The monitor server 145 will be able to record video/still images from any such agent workstation 135 and store them at, e.g., a call records database 450 (e.g., a recorder, see FIG. 4). For example, the agent workstation 135 may intercept an IP video stream, capture a screen on the agent workstation 135 that is displaying the video/image from the camera 224, or through any other connection method suitable to allow the capture of the video or still picture of the agent and or agents locality. In some implementations, the capture of the video/still image from the camera 224 may be performed as the video/still image stream is transmitted to another system.

Voice, screen or any other associated media/communication recording data may be associated with the agent by, e.g., tagging the data with agent ID included. The video/still picture capture may be controlled by the monitor server 145, and the recorded video/still pictures may be associated to the agent by, e.g., tagging the data with an agent ID.

Figure 3:
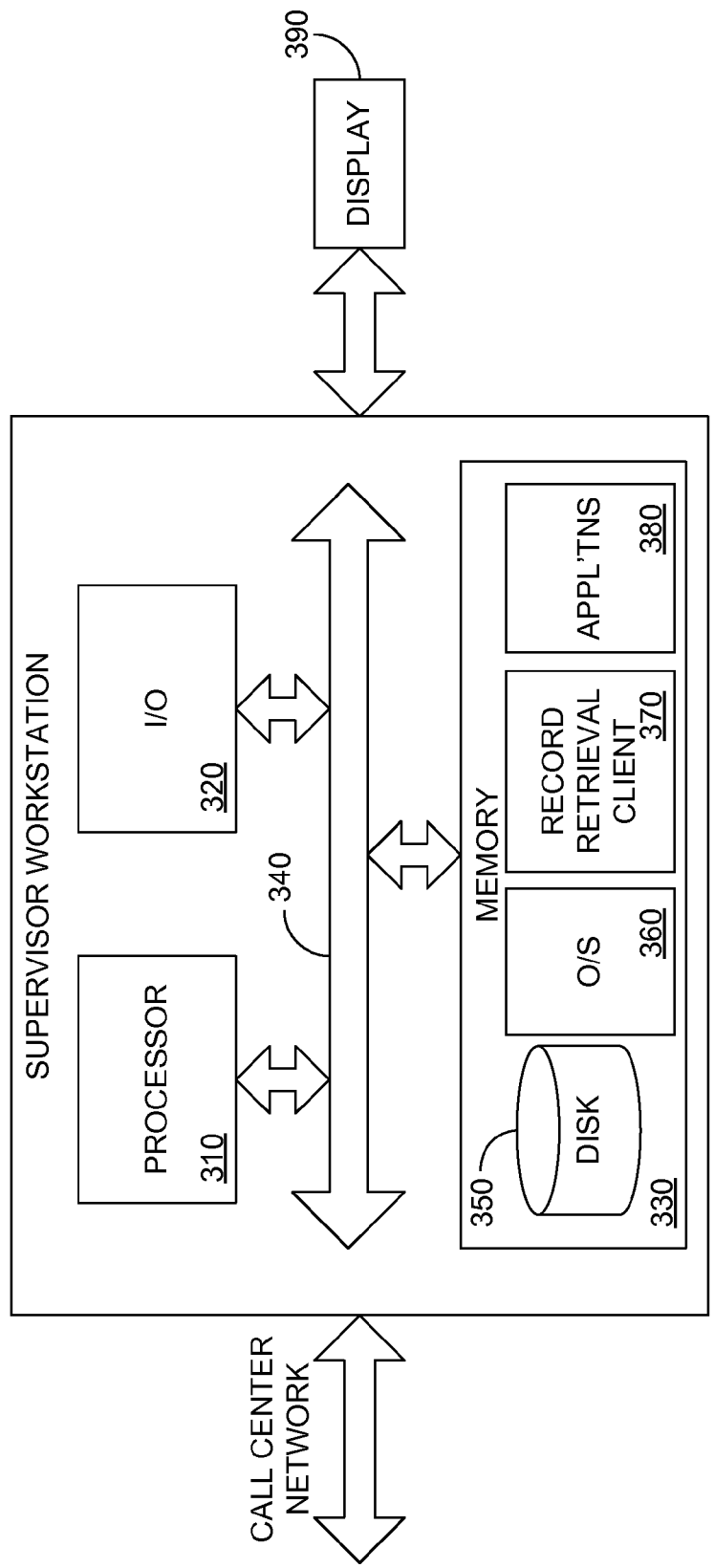
FIG. 3 is a block diagram illustrating a supervisor workstation used to review agent activity.

FIG. 3 shows a block diagram of the supervisor workstation. The supervisor workstation can include many of the same components as the agent workstation. The supervisor workstation can include hardware devices such as a processor 310, I/O 320, and memory 330. Each of these hardware devices can communicate with each other via a bus 340. The I/O 320 can include an input interface such as, for example, a keyboard, a mouse, or some other suitable device, an output display interface such as, for example, a monitor 390, a printer, or data communications interface, among others. The memory 330 of the system can include a RAM, ROM, a hard drive, or other suitable storage mechanisms. Also stored in memory 330 can be a number of applications, each of the applications being enabled for execution on the processor 310. In the current example, the memory includes an operating system 360, a record retrieval client 370, and other applications 380.

The record retrieval client 370 can be configured to retrieve records from the call records database via the call center network after the monitor server has stored the call record. The records can be stored and searched according to parameters related to agent information, call information and parameters suitable for searching a call records database and a call center configuration database. The record retrieval client 370 can further replay the records retrieved from the call records database such that a supervisor can review the activities of the selected agent, for example. During replay, the record retrieval client 370 can send the recorded on-screen activities to the display 390 for rendering, while replaying the voice data synchronously via a speaker (not shown) at the supervisor workstation 300. Thus, the conversation between the agent and the contact can be heard while simultaneously viewing the on-screen activities of the agent. This can be particularly useful in providing feedback to the agent by providing critique from the supervisor, providing further training to correct noted mistakes, or for resolving disputes between the contact and the call center, among many others. It should be noted that the record retrieval client 370 could be provided to any of the agents as well. Moreover, it should also be noted that the record retrieval client 370 could be used to monitor data received directly from the agent workstation(s).

Figure 4:
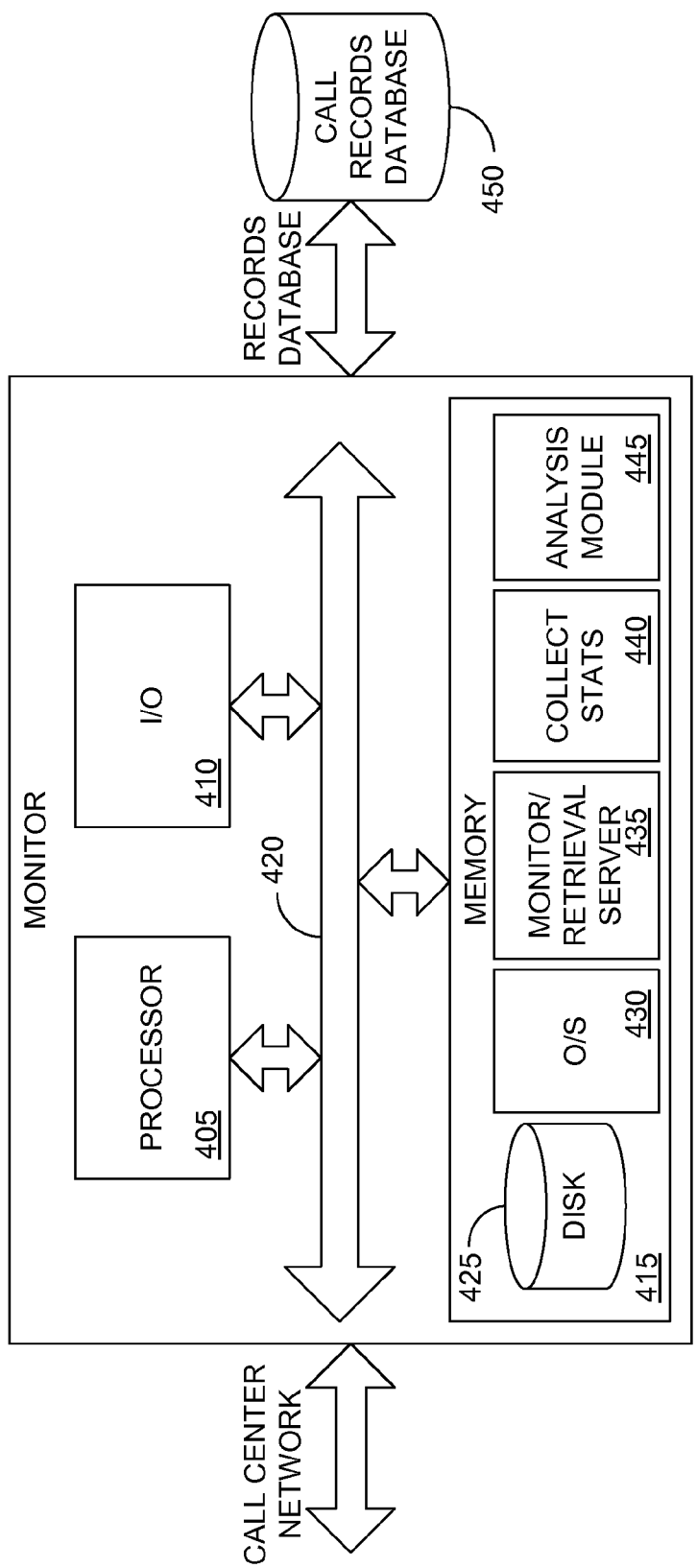
FIG. 4 is a block diagram illustrating a monitor including a complex recording trigger.

FIG. 4 shows a block diagram of a monitor server 400. The monitor server 400 can include a processor 405, I/O 410 and memory 415. Each of these devices is coupled together by a bus 420, which facilitates communications between the processor 405, I/O 410 and memory 415. The processor can be any commercially available processor. The I/O can include an interface for myriad hardware devices. For example, the I/O 410 can include an input interface such as, for example, a keyboard, a mouse, or some other suitable device, an output interface such as, for example, a monitor, a printer, or data communications interface, among others. The memory 415 of the system can include a RAM, ROM, a hard drive, or other suitable storage mechanisms. Also stored in memory 415 can be a number of applications, each of the applications being enabled for execution on the processor 405. In the current example, the memory includes an operating system 430, a monitor/retrieval server 435, a statistics collection module 440, and an analysis module 445. It should also be understood that the memory can further include other applications (not shown). The monitor server 400 can include the call records database 450, which can be located externally to the monitor server 400, internally to the monitor server 400, or a combination thereof.

The call records database can be very large, and thus can be implemented in any mode that properly implements a designed storage capacity.

It should be understood that the monitor server 400 operates similarly to the monitor server described in U.S. patent application Ser. No. 11/166,630, entitled "Improved Method and Apparatus for Simultaneously Monitoring Computer User Screen and Telephone Activity from a Remote Location," in order to capture and record data from the agent workstation(s). However, the monitor server 400 additionally includes the functionality to collect information, video imagery, etc. on the agent(s) by recording the agent(s) and their activities in accordance with triggers determined by the statistics collection module 440. The triggers enable the system to detect any patterns in the behavior of the agent(s).

The analysis module 445 can identify characteristics of an agent, or a group of agents. For example, facial recognition techniques may be applied to recognize an agent's identity. The analysis module 445 may also analyze and recognize objects in a field of view of the camera 224. The analysis module 445 may be configured to determine if an area or location is the area or location purported by the agent.

It should be noted that the monitor/retrieval server 435 can use other triggers to decide whether to monitor or record an agent's workstation. For example, a scorecard is developed that helps a supervisor evaluate an agent based upon a variety of categories, including, for example, courteousness, skill, system knowledge, areas of expertise, etc. A supervisor or administrator can then set a threshold score, whereby agents meeting the threshold are not monitored, while agents not meeting the threshold are monitored. It should also be understood that the scorecard can be used to trigger monitoring when an agent with a low score in a particular area of expertise is handling calls in that same area of expertise, thereby enabling tighter monitoring of agents that may have trouble handling specific types of calls.

Figure 5:
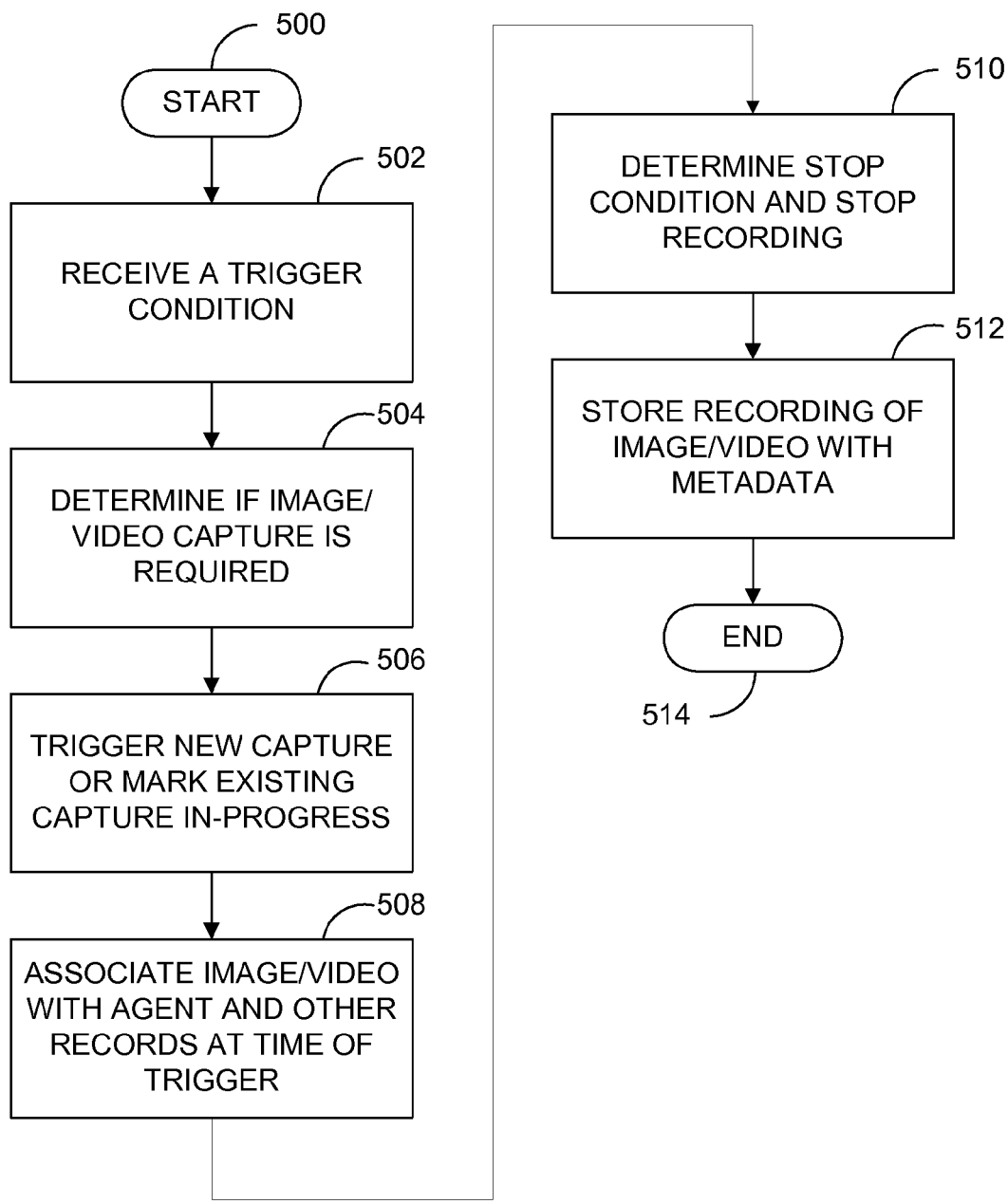
FIG. 5 shows an operational scenario for monitoring an agent terminal.

FIG. 5 shows an operational scenario for monitoring an agent terminal. At 500, the process begins. At 502, it is determined if a trigger condition exists. For example, the trigger condition may be at a beginning, end or during a conversation between the agent and a caller and can be set based upon business rules. The trigger condition may be initiated upon a call being placed by the agent or screen data being entered by the agent. The rules may include controlling the triggering of the capture of video/still pictures of agent or agent location such that the data is captured and recorded on specific events, time of day, on a percentage of events, or if capturing should be a video stream or still picture. At 502, it is determined if image/video capture is required. Depending on the trigger, image/video capture may be performed based on requirements, such as legal compliance, human resource requirements, random sampling, etc.

At 506, it is determined if a new capture is triggered or to mark an existing capture in-progress. Metadata indicative of the agent, the trigger condition, agent terminal, agent location, etc., may be added to the capture to note that a trigger occurred requiring the capture. At 508, the image/video capture may be associated with other records. For example, records such as audio, screen capture, email, chat, etc., may be associated to the image/video capture using a common identifier.

At 510, it is determined if a stop condition exists, and if so, the capture of the image/video is stopped. For example, a conversation with a caller may have ended or a random sampling time ended, etc. At 512, the captured image/video data may be recorded and augmented with metadata for later retrieval. At 514, the process ends.

Figure 6:
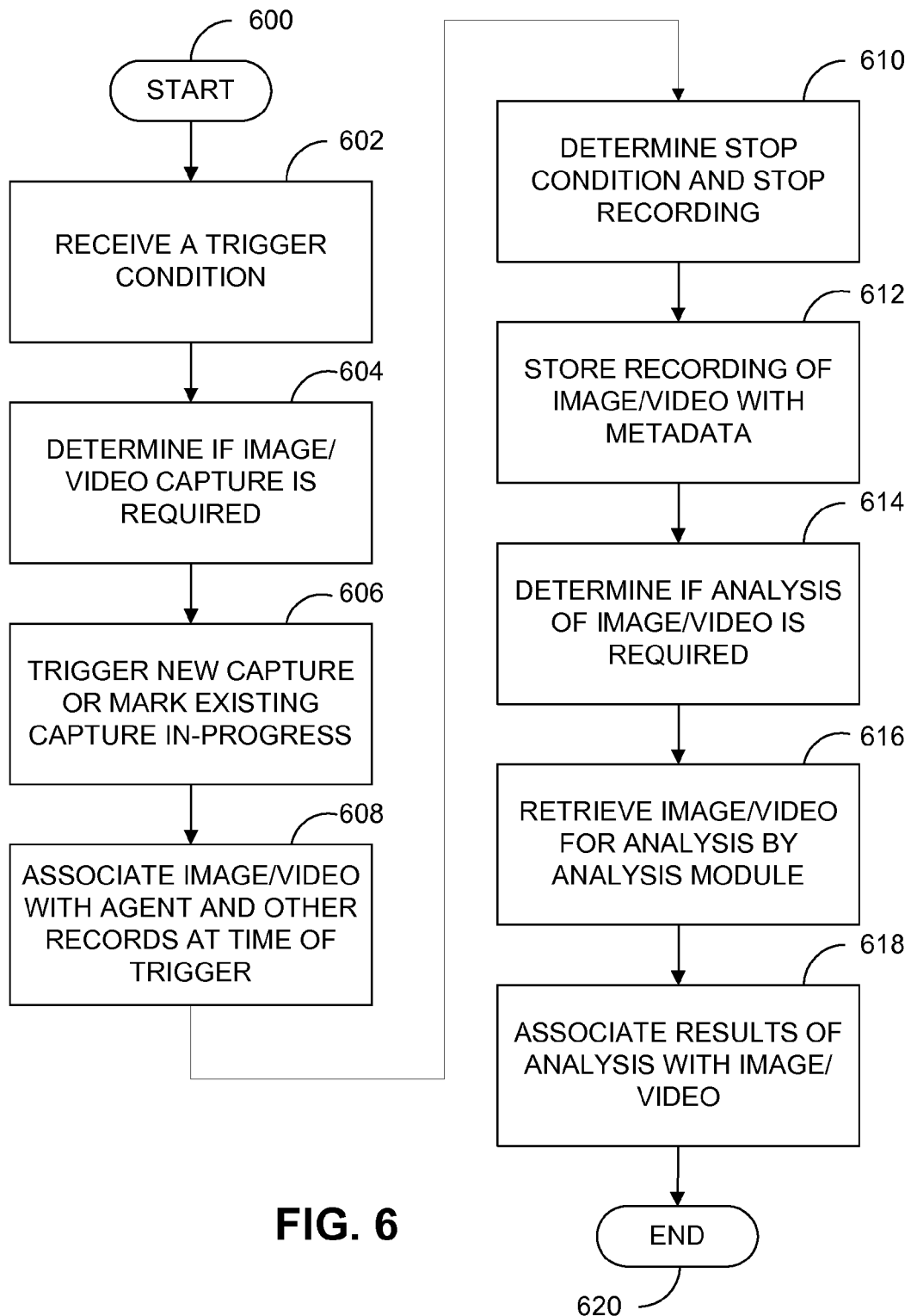
FIG. 6 shows another operational scenario for monitoring an agent terminal.

FIG. 6 shows another operational scenario for monitoring an agent terminal. The process begins at 600. Operations 602-612 are similar to operations 502-512, described above. At 614, it is determined if analysis of the image/video is required. If so, then at 616, the recorded image/video is retrieved for analysis by the analysis module. The analysis module 445 may determine characteristics of the captured image/video. At 618, the results of the analysis at 616 may be associated with the image/video. As discussed below, the results may be used for many purposes to ensure compliance, quality, security, coaching, etc. At 620, the process ends.

Thus, as described above, the implementations may be used to provide coaching of an agent. For example, during live monitoring, a supervisor can see an agent and/or a location during live monitoring of a call to see how the agent handles a situation and the environment they are in. The video/pictures may be jointly or separately displayed in near real-time with the monitoring of the agents communication or screen. For coaching purposes, the agent supervisor may be able to discuss the agent's performance/status. This may be performed as a video conference, and the implementations above may record the conference for human resource record keeping.

The implementations above also provide for security, such as a validation of identity of the agent. There is a concern that someone other than the agent may be handling calls or working on back office applications without company knowledge or consent. A single or multiple picture or video clip capture may be triggered at the beginning, end or during a conversation, or back office transaction and stored by the recording subsystem in the monitor server 145. These are then associated with any other recording taken at the time such as the voice or screen recording. On replay, the face of the agent may be captured and their ID verified. The replaying of the video/still pictures may be time synchronized with the replay of the agent's voice or screen activities. In some implementations, the video or picture may be automatically analyzed (in near-real time or after recording) to validate the id of the agent.

The implementations above may be used to validate location security and/or conformance to company policies. There may be a concern that other people will be in the locality of the agent and be able to either monitor their calls or transactions, or just disrupt the quality of the working environment such as to reduce the quality of the agent's ability to work. In addition, other issues with the quality or safety of the location may also be brought into question. A single picture or video clip may be triggered at the beginning, end or during a conversation or back office transaction and stored by the recording system. This may be associated with other recording(s) taken at the time, such as the voice or screen recording. On replay, the location of the agent will be captured and the status of their location can verified. In some implementations, the video or picture may be automatically analyzed in near real time or later to automatically indicate and violation of location rules or to indicate that other person was present.

The systems and methods data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

While this disclosure has been made with specific detail with reference to the present disclosure it should be understood that many variations and modifications may be effected without departing from the scope of the disclosure as described in the appended claims.

What is claimed is:

1. A method for monitoring a remote agent, comprising:
receiving, at a monitoring server, data polls and metadata from an agent workstation remote from the monitoring server;
analyzing the metadata at the monitoring server;
identifying, in the metadata, during an ongoing conversation between an agent at the agent workstation and a caller, whether a trigger condition exists at the agent workstation; and
upon identifying by the monitoring server that the trigger condition exists:
data recording telephone and on-screen computer activities associated with the agent at the agent workstation;
capturing, during the ongoing conversation, video imagery of the agent or an environment in which the remote workstation is located,
providing a common transaction identifier that associates the captured video imagery to the activities of the agent recorded during the capturing,
identifying the agent using facial recognition,
storing the captured video imagery, the common transaction identifier, the identity of the agent, and the telephone and on-screen recordings, in a data store, and
determining whether the agent's activities are inconsistent with predetermined parameters associated with remote agent activities by at least reviewing contents of the data store;
wherein the capturing of the video imagery is contingent upon the trigger condition being initiated, wherein the trigger condition is initiated upon screen data being entered by the agent into the agent workstation during the ongoing conversation.

2. The method of claim 1, further comprising streaming the video imagery to a recorder as a continuous stream video/pictures in near-real-time from the agent workstation.

3. The method of claim 1, further comprising: monitoring the agent in near real-time to view the agent's interaction with the caller; and
providing coaching to the agent to address deficiencies in the agent's interaction.

4. The method of claim 1, further comprising replaying the video imagery in synchronization with the agent's voice or screen data.

5. The method of claim 1, further comprising playing back the data recording and captured video imagery after synchronizing said data recording and captured video imagery.

6. The method of claim 1, wherein said data recording and captured video imagery are conducted passively by capturing operating system graphics primitives from the agent workstation.

7. The method of claim 1, wherein said data recording and video imaging comprise screen scraping the agent workstation.

8. A system, comprising:
a processor; and
a memory coupled to the processor, the memory storing instructions which when executed by the processor cause the system to perform a method comprising:
 transmitting, to a monitoring center, data comprising records of telephone and on-screen computer activities associated with an agent at an agent workstation remote from the monitoring center, said data further comprising metadata;
 analyzing, at the monitoring center, said metadata to identify whether a trigger condition exists at the agent workstation during an ongoing conversation between the agent and a caller; and
 upon identifying that trigger condition exists:
  capturing, during the ongoing conversation, video imagery of the agent or an environment in which the remote workstation is located,
  providing a common transaction identifier that associates the captured video imagery to the activities of the agent recorded during the capture,
  identifying the agent using facial recognition, storing the captured video imagery, the common transaction identifier, the identity of the agent, and the telephone and on-screen recordings, in a data store, and
  determining whether the agent's activities are inconsistent with predetermined parameters associated with agent activities by at least reviewing contents of the data store;
 wherein the capturing of the video imagery is contingent upon the trigger condition being initiated, wherein the trigger condition is initiated upon screen data being entered by the agent into the agent workstation during the ongoing conversation.

9. The system of claim 8, wherein the method further comprises streaming the video imagery to a recorder as a continuous stream video/pictures in near real-time from the agent workstation.

10. The system of claim 8, wherein the method further comprises monitoring the agent in near real-time to view the agent's interaction with the caller and providing coaching to the agent to address deficiencies in the agent's interaction.

11. The system of claim 8, wherein the method further comprises replaying the video imagery in synchronization with the agent's voice or screen data.

12. The system of claim 8, further comprising playing back the data recording and captured video imagery after synchronizing said data recording and captured video imagery.

13. The system of claim 8, wherein said data recording and video imaging are conductive passively by capturing operating system graphics primitives from the agent workstation.

14. The system of claim 8, wherein said data recording and video imaging comprise screen scraping the agent workstation.

15. A non-transitory computer-readable medium having stored thereon a sequence of instructions which when executed by a system causes the system to perform a method comprising:
 recording in data updates and metadata telephone and on-screen computer activities associated with an agent at an agent workstation;
 identifying, at a monitoring center remote from the agent workstation, with the metadata whether a trigger condition exists at the agent workstation during an ongoing conversation between the agent and a caller; and
 upon identifying that the trigger condition exists:
  capturing, during the ongoing conversation, video imagery of the agent or an environment in which the remote workstation is located,
  providing a common transaction identifier that associates the captured video imagery to the activities of the agent recorded during the capture,
  identifying the agent using facial recognition, storing the captured video imagery, the common transaction identifier, the identity of the agent, and the telephone and on-screen recordings, in a data store, and
  determining whether the agent's activities are inconsistent with predetermined parameters associated with remote agent activities by at least reviewing contents of the data store;
 wherein the capturing of the video imagery is contingent upon the trigger condition being initiated, wherein the trigger condition is initiated upon screen data being entered by the agent into the agent workstation during the ongoing conversation.

16. The non-transitory computer-readable medium of claim 15, wherein the method further comprises streaming the video imagery to a recorder as a continuous stream video/pictures in near real-time from the agent workstation.

17. The non-transitory computer-readable medium of claim 15, wherein the method further comprises monitoring the agent in near real-time to view the agent's interaction with the caller and providing coaching to the agent to address deficiencies in the agent's interaction.

18. The non-transitory computer-readable medium of claim 15, wherein the method further comprises replaying the video imagery in synchronization with the agent's voice or screen data.

19. The non-transitory computer-readable medium of claim 15, further comprising playing back the data recording and captured video imagery after synchronizing said data recording and captured video imagery.

20. The non-transitory computer-readable medium of claim 15, wherein said data recording and video imaging are conductive passively by capturing operating system graphics primitives from the workstation.

21. The non-transitory computer-readable medium of claim 15, wherein said data recording and video imaging comprise screen scraping the workstation.

* * * * *